US006417834B1

(12) United States Patent
Balz

(10) Patent No.: US 6,417,834 B1
(45) Date of Patent: Jul. 9, 2002

(54) ARRANGEMENT FOR DISPLAYING THE SIGNAL STATUSES OF A QAM-MODULATED SIGNAL

(75) Inventor: Christoph Balz, Munich (DE)

(73) Assignee: Rohde & Schwarz GmbH & Co. KH, München (DE)

( * ) Notice: Subject to any disclaimer, the term of this patent is extended or adjusted under 35 U.S.C. 154(b) by 612 days.

(21) Appl. No.: 08/751,057

(22) Filed: Nov. 15, 1996

(30) Foreign Application Priority Data

Dec. 21, 1995 (DE) .......................... 195 47 896

(51) Int. Cl.[7] .................................. G09G 5/36
(52) U.S. Cl. .................. 345/134; 345/133; 345/135
(58) Field of Search ........................ 345/134, 135, 345/440, 515, 507, 509, 199, 516, 517, 514, 203; 371/43; 348/389

(56) References Cited

U.S. PATENT DOCUMENTS 4,630,099 A * 12/1986 Rzeszewski ............... 348/389
4,631,533 A * 12/1986 Mark, Jr. .................. 345/134
5,442,646 A * 8/1995 Chadwick et al. ............ 371/43
5,479,606 A * 12/1995 Gray ......................... 345/134
5,612,710 A * 3/1997 Christensen et al. ........ 345/515

OTHER PUBLICATIONS

Hewlett Packard data sheets, Using Vector Modulation Analysis in the Integration, Troubleshooting and Design of Digital RF Communications Systems, Product Note HP 89400–8, pp. 1–28.

* cited by examiner

Primary Examiner—Bipin Shalwala
Assistant Examiner—David L. Lewis
(74) Attorney, Agent, or Firm—Schiff Hardin & Waite

(57) ABSTRACT

In an arrangement for graphic display, in the IQ plane on the screen of a display device, of IQ values emitted at an output of a demodulator for quadrature-amplitude-modulated signals, an address of the data memory is allocated to each individual IQ value and a pixel of the display device is allocated to each address of the data memory. Information allocated to the respective IQ value, e.g. a predetermined pixel hold time, is stored under each address of this data memory. A processor is directly connected to the IQ output of the demodulator, and determines the associated IQ value address in the data memory for each IQ value.

6 Claims, 1 Drawing Sheet

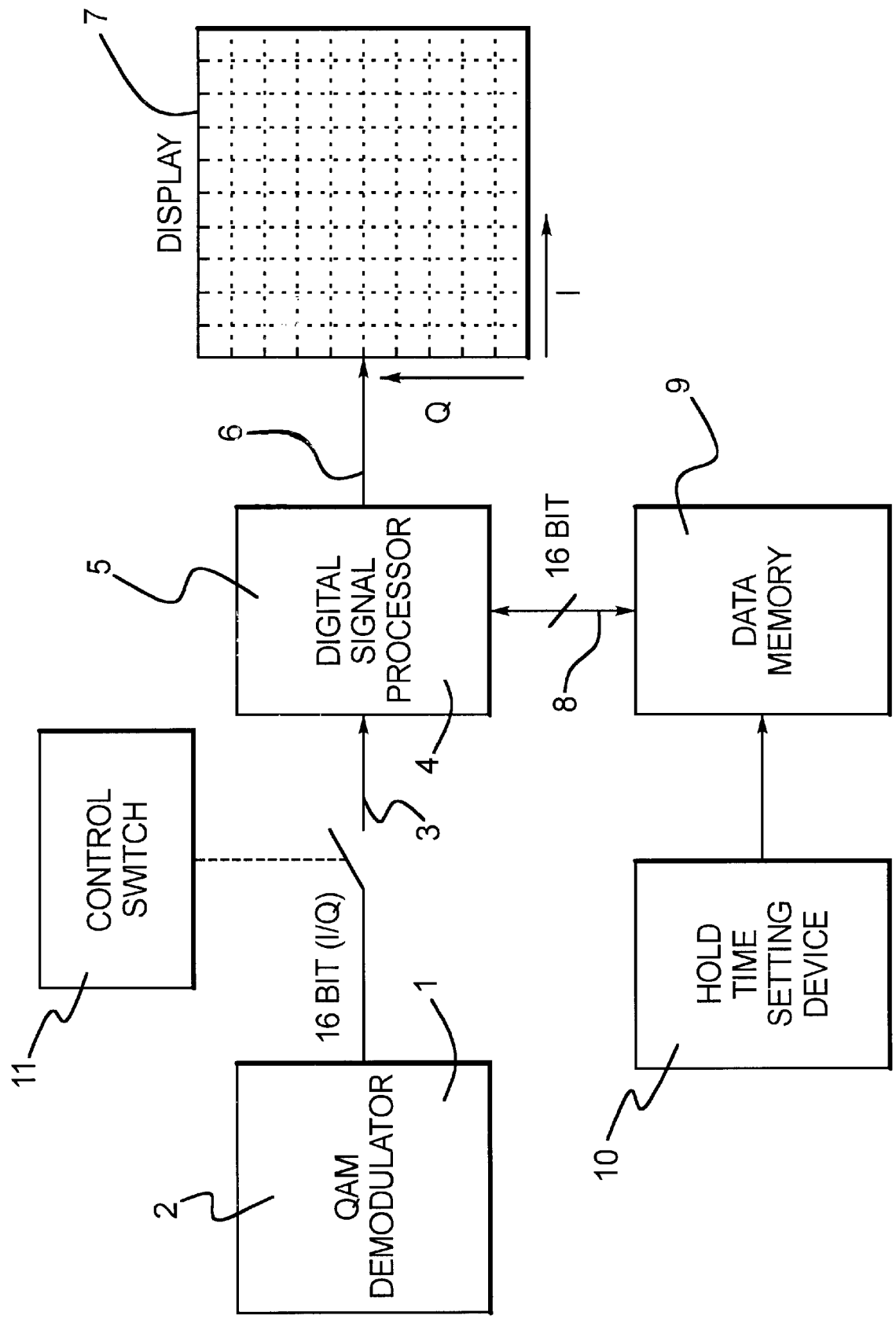

ARRANGEMENT FOR DISPLAYING THE SIGNAL STATUSES OF A QAM-MODULATED SIGNAL

BACKGROUND OF THE INVENTION

The present invention relates to an arrangement for graphically displaying IQ values of a demodulator for quadrature-amplitude-modulated signals.

An arrangement of this type is known (data sheet of the vector signal analyzer HP 89400-8 of the company Hewlett Packard). The IQ values emitted serially at the IQ output of the QAM demodulator are successively and intermediately stored in a data memory in the sequence of their occurrence, and can then be read out therefrom via a processor and graphically displayed on a video screen in the IQ plane (X-Y coordinate. plane). For this purpose, a data memory with a large storage capacity is required, e.g. for only 4096 signal statuses a 4 MB data memory is required (page 4 of the Hewlett Packard data sheet). Moreover, with this known arrangement possible errors. in the data transmission path between the transmitter and the receiver can be measured only in a complicated way.

SUMMARY OF THE INVENTION

It is an object of the present invention to provide an arrangement having a simple and economical construction, and which moreover enables a universal method of operation and evaluation of the IQ values.

In general terms the present invention is an arrangement for the graphic display, in the IQ plane on the screen of a display device, of the IQ values emitted at the output of a demodulator for quadrature-amplitude-modulated signals. The arrangement has a data memory and a processor that controls the display device. An address of the data memory is allocated to each individual IQ value and a pixel of the display device is allocated to each address of the data memory. Information allocated to the respective IQ value is stored under each address of this data memory. The processor is directly connected to the IQ output of the demodulator and is structured such that it determines the associated IQ value address in the data memory for each IQ value.

Advantageous developments of the present invention are as follows.

A predetermined pixel hold time is stored under each address of the data memory upon occurrence of the corresponding IQ value.

Under each address of the data memory is stored the frequency with which this address, and thereby the corresponding IQ value, has been determine din a predetermined acquisition time.

In the inventive arrangement, a separate address of the data memory is allocated to each individual digitized IQ value, and it is thereby possible to store separate information respectively for each individual pixel allocated to an IQ value. One possibility for this is that the desired pixel hold time is respectively stored under each address. Another possibility is to store under each address the frequency with-which this respective address, and thereby the associated IQ value, occurs within a predetermined acquisition time period. In addition to these two particularly advantageous possibilities, arbitrary additional information can also be stored under the respective addresses. This information. is taken into account during the display of a respective pixel, e.g. different brightnesses or different colors for the pixel display.

For an inventive arrangement, only one data memory with a relatively small memory capacity is required. For 8-bit quantized IQ values, for example, only one 65,536-word data memory is required. Nonetheless, with the inventive arrangement not only transmission-side errors of the modulator, such as IQ phase errors, IQ amplitude inequalities or, respectively, the carrier suppression, are measured, but errors of the transmission path between the transmitter and the receiver, e.g. the phase jitter, the sinusoidal interference, the signal-to-noise ratio or, respectively, the vector error magnitude (VEM), RMS and peak are also measured.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, and in which:

The single FIGURE is a block diagram depicting the present invention.

DESCRIPTION OF THE PREFERRED EMBODIMENT

The single FIGURE shows an arrangement for the graphic display of the signal statuses of a quadrature-amplitude-modulated (QAM) signal in the IQ plane on the screen 7 of a display device. The I (IN phase) and Q (quadrature) output 1 of the demodulator 2 of a QAM receiver (not shown in more detail) is directly connected to the input 4 of a digital signal processor 5 via a data lead 3. The associated positions of the signal statuses in the IQ plane are interpreted in the signal processor 5 from these serially supplied I and Q values. The corresponding signal status in the IQ plane can be displayed on the screen 7 of a display device via the data lead 6. The display device is for example an LC (liquid crystal) display. Moreover, the processor 5 is connected to a data memory 9 via a data lead 8. A separate address of the data memory is allocated to each possible IQ value. In the exemplary embodiment shown, the status diagram to be displayed in the IQ plane on the screen 7 consists of 256×256=65,536 IQ values and the same number of pixels (points of the screen). The position of any one of the pixels on the screen can thus be specified with 16 bits. The data memory 9 has for its part 65,536 addresses, of which each is again specified through 16 bits. Arbitrary information for the individual pixels can be stored under each of the addresses of the data memory 9.

A first operating possibility for an inventive arrangement consists in storing, under each address of the data memory 9, of information concerning the time in which the individual pixels are supposed to be visible on the screen. If for example a pixel hold time of 20 seconds is desired by the user with a refresh rate of 1 second, the number 20 is for example stored in the individual addresses of the data memory 9 allocated to the measured pixels. This can ensue via the user, for example via a hold time setting device 10 allocated to the individual memory cells of the data memory 9. During the display of the IQ values on the screen 7 via the processor 5, the content of each individual address of the data memory 9 is respectively queried. A pixel is displayed on the display if the content of the allocated address is greater than zero. If a pixel is displayed on the screen via the processor 5, the content of the memory cell is simultaneously lowered by one under the allocated address. If in the example selected a pixel has been displayed 20 times and has thus reached the selected pixel hold time, it is no longer displayed on the screen. Upon a renewed occurrence of the observed IQ value, the memory cells under this address are loaded anew with the number 20, and a renewed occurrence of this pixel with the selected hold time is displayed. Since the selection of the hold time can be arbitrarily large, an infinitely long hold time can also be set. In this case, the reduction of the content of the memory cell upon readout is omitted.

Another operating possibility for the display device consists in the respective storing under each address of how often a signal status occurs within a predetermined acquisition time. A predetermined acquisition time can be set via a control switch 11. Within this predetermined time span, the content of the memory address is respectively increased by one under an address of the data memory 9 via the processor 5 if an IQ value that is allocated to this address of the data memory, and thereby to the respective pixel position, is respectively determined via the processor. In this way, under each address of the data memory is stored the frequency with which this address, and thereby the associated pixel, respectively occurs. A wide range of error calculations can be carried out on this basis.

In the exemplary embodiment shown, the signal statuses of a 64 QAM signal are displayed on the screen of the display apparatus 7. From this, the user can then determine the type of modulation used and its quality.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An arrangement for graphically displaying, in an IQ plane on a screen of a display device, IQ values emitted at an output of a demodulator for quadrature-amplitude-modulated signals, comprising:

a data memory;

a processor, that controls the display device, connected to the data memory;

a respective address of the data memory allocated to each individual IQ value and a respective pixel of the display device allocated to each address of the data memory;

the processor directly connected to the IQ output of the demodulator, the processor determining an associated IQ value address in the data memory for each IQ value; and a respective frequency stored under each address of the data memory, the respective frequency being a frequency with which a respective address of the data, and thereby the corresponding IQ value, has been determined in a predetermined acquisition time.

2. The arrangement according to claim 1, wherein a respective predetermined pixel hold time is respectively stored under each address of the data memory upon occurrence of a corresponding IQ value.

3. An arrangement for graphically displaying, in an IQ plane on a screen of a display device, IQ values emitted at an output of a demodulator for quadrature-amplitude-modulated signals, comprising:

a processor connected to the display device;

a data memory connected to the processor, the data memory having a plurality of addresses;

each individual IQ value of the IQ values being allocated to a respective address of the plurality of addresses of the data memory;

the processor being directly connected to the IQ output of the demodulator, the processor determining a respective address in the data memory for each of the IQ values emitted at the output of the demodulator; and a respective frequency stored under each address of the data memory, the respective frequency being a frequency with which a respective address of the data, and thereby the corresponding IQ value, has been determined in a predetermined acquisition time.

4. The arrangement according to claim 3, wherein the information is a predetermined pixel hold time.

5. The arrangement according to claim 3, wherein the information is a frequency with which a respective address, and thereby a corresponding IQ value, has been determined in a predetermined acquisition time.

6. An arrangement for graphically displaying, in an IQ plane on a screen of a display device, IQ values emitted at an output of a demodulator for quadrature-amplitude-modulated signals, comprising:

a processor connected to the display device;

a data memory connected to the processor, the data memory having a plurality of addresses;

each individual IQ value of the IQ values being allocated to a respective address of the plurality of addresses of the data memory;

the processor being directly connected to the IQ output of the demodulator, the processor determining a respective address in the data memory for each of the IQ values emitted at the output of the demodulator;

a hold time setting device connected to said data memory, the information being a predetermined pixel hold time that is set by the hold time setting device and that is stored under each address of the data memory upon occurrence of a corresponding IQ value; and a respective frequency stored under each address of the data memory, the respective frequency being a frequency with which a respective address of the data, and thereby the corresponding IQ value, has been determined in a predetermined acquisition time.

* * * * *

UNITED STATES PATENT AND TRADEMARK OFFICE
CERTIFICATE OF CORRECTION

PATENT NO. : 6,417,834 B1
DATED : July 9, 2002
INVENTOR(S) : Christoph Balz

It is certified that error appears in the above-identified patent and that said Letters Patent is hereby corrected as shown below:

<u>Title page,</u>
Item [73], please correct the designation of the assignee from "Rohde & Schwarz GmbH & Co. KH" to -- Rohde & Schwarz GmbH & Co. KG --.

Signed and Sealed this

Nineteenth Day of November, 2002

*Attest:*

JAMES E. ROGAN
*Attesting Officer*  *Director of the United States Patent and Trademark Office*